Nov. 13, 1928.
O. B. HALEY
LUBRICANT METER
Filed Feb. 23, 1927
1,691,187
2 Sheets-Sheet 1
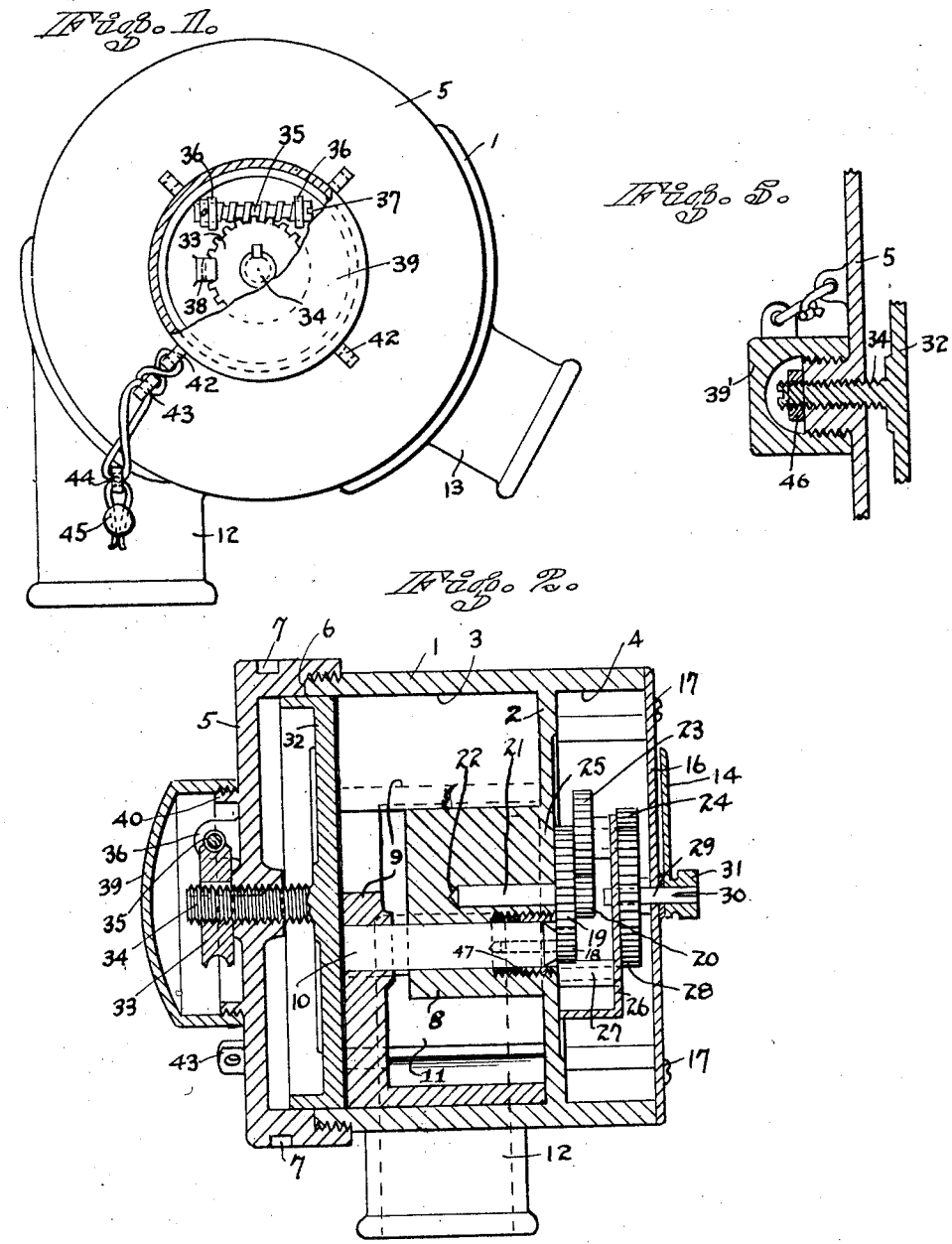
INVENTOR.
Ora B. Haley
BY Miller & Boyken
His ATTORNEYS.

Nov. 13, 1928.
O. B. HALEY
LUBRICANT METER
Filed Feb. 23, 1927
1,691,187
2 Sheets-Sheet 2
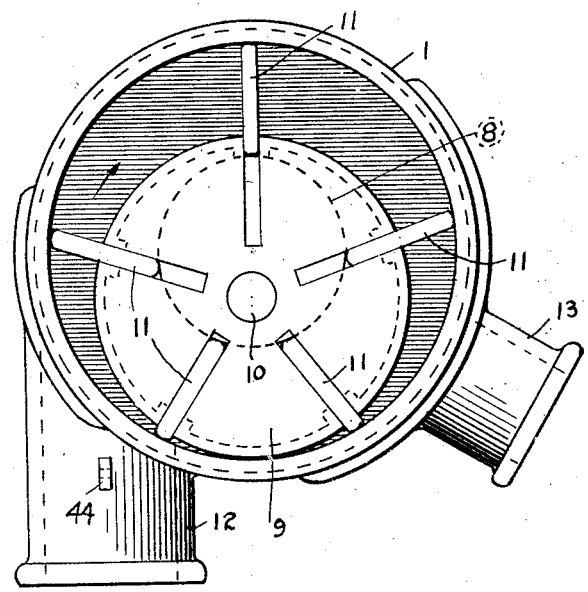
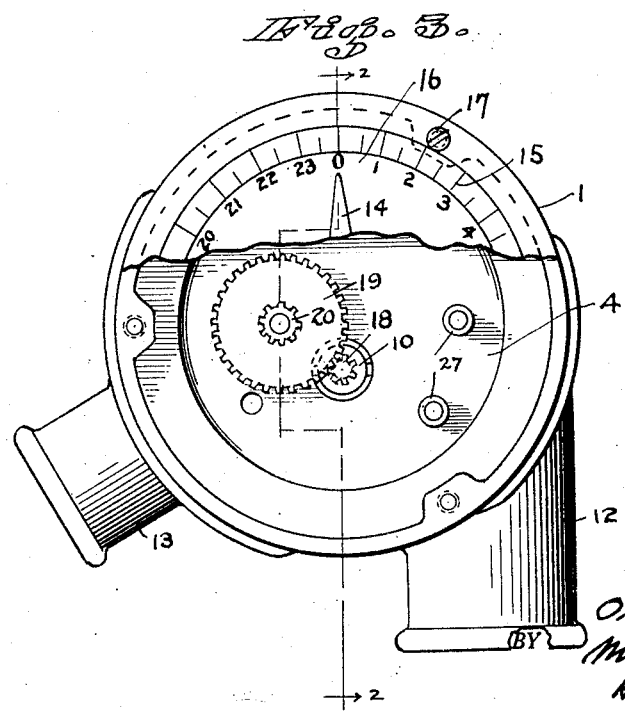
INVENTOR.
Ora B. Haley
BY Miller & Boykin
His ATTORNEYS.

Patented Nov. 13, 1928.

1,691,187

UNITED STATES PATENT OFFICE.

ORA B. HALEY, OF SAN FRANCISCO, CALIFORNIA.

LUBRICANT METER.

Application filed February 23, 1927. Serial No. 170,198.

This invention relates to lubricant meters and has to do with certain improvements in the type of meter disclosed in my U. S. Patent #1,611,346, granted on December 21, 1926.

The objects of the invention are to effect improvements whereby the meter is simplified in construction and is adjustable above and below an average capacity so that with different grades of oils or greases it may be set and sealed to register precisely in pounds or other units the amount of oil or grease flowing through the meter and with any pressure or head on the lubricant.

The meter is of the rotary sliding vane type wherein the liquid or semi-liquid lubricant being forced therethrough revolves a vane carrying hub which in turn revolves an indicating hand through means of a set of gearing.

The drawing accompanying this specification shows the preferred construction. Fig. 1 is a side elevation of the meter with portion of its sealing cover broken away to reveal the capacity adjusting screw beneath. Fig. 2 is a section of Fig. 1 as seen from the line 2—2 of Fig. 3. Fig. 3 is the reverse side of the meter from that shown in Fig. 1 with portion of the outside index plate broken away and some of the counter gear train removed. Fig. 4 is a view similar to that of Fig. 1 with the cover and adjustable capacity piston omitted to show the rotor and vanes. Fig. 5 is a sectional detail of a variation in the means for adjusting the capacity piston.

In further detail the meter comprises a cylindrical body 1 partitioned at 2 to form a relatively deep circular chamber 3 and a shallower chamber 4.

The deep chamber is accurately finished within and closed by a cover 5 threaded to the body and seated pressure tight against a finished shoulder on the cover at 6. The cover is preferably provided with suitable spanner wrench holes as at 7 so that it may be screwed on tightly.

Within the chamber 3 concentrically extends a hub 8 from partition 2 and straddling this hub is a slotted rotor 9 positioned eccentrically within the chamber and provided with a spindle 10 fixed to the rotor and rotatably extending through a stuffing box 47 in the hub 8. Vanes 11 are slidably mounted in the slots of the rotor and are of a size equal in length to the rotor and in breadth to just touch the inner diameter of the chamber and outer diameter of the hub so that as the eccentrically mounted rotor is revolved the vanes slide back and forth relative to the rotor, the edges of the vanes being smoothly rounded to prevent cutting.

Threaded inlet and outlet pipe connections are provided respectively at 12 and 13 for entry and discharge respectively of the liquid to be metered and which in following its course through the device rotates the rotor in the direction indicated by the arrow in Fig. 4, and the revolutions of the rotor are indicated by means of a pointer 14 against suitable graduations 15 on a dial plate 16 secured over the shallow chamber 4 by means of screws 17.

The pointer is actuated through means of gearing as follows: On the end of spindle 10 is a small pinion 18 secured in place by having its shank pressed tightly into a hole in the end of the spindle. This pinion is smaller than the spindle so that it will not interfere with removal of the rotor, and meshing with the pinion is a gear 19 surmounting a pinion 20 both fixed to a spindle 21, rotatably extending into a bore 22 in the hub 8, while meshing with pinion 20 is a gear 23 securely mounted on a common axle 25 with a pinion 24 rotatably supported in a plate 26 and which plate is supported and spaced from partition 2 on sleeve pins 27, while outside of plate 26 is a gear 28 meshing pinion 24 and secured to a shaft 29 rotatable in plate 26 and cover dial 16.

This shaft 29 extends beyond the dial 16 and is split at 30 so as to seat with a spring grip within the bore of a thumb nut 31 to which the pointer 14 is secured so that the pointer may be turned back to zero from any point and will be then firmly held in place by the frictional grip of the split shaft.

As will be noted in Fig. 3 the zero point is located at the top center of the dial with meter standing in the position shown and which is the general position of mounting on lubricant dispensing apparatus.

The cover 5 is bored within to correspond with the bore of the chamber 3 and slidably mounted within is a nicely fitting piston 32 provided with a flat face adapted to contact with the outer ends of the rotor 9 and its vanes 11 or to be withdrawn therefrom varying degrees and securely held in any adjustment.

In Figs. 1 and 2 are means employed for adjustment of this piston 32 is a wormwheel 33 splined to the outer end of a threaded stem 34 which extends from the rear side of piston and screws through an opening in the cover 5, the wormwheel being turned by means of a worm 35 mounted in bearings 36 so that it cannot move endwise, and slotted at 37 for adjustment by a screwdriver to revolve the wormwheel in either direction to thereby very slightly screw the piston 32 either in or out.

This wormwheel may be held from outward displacement either by the use of a hobbed wormwheel as shown or by additional lugs as at 38 overlying its outer face.

After adjusting the worm the desired degree, the adjusting mechanism is covered by a cap 39 threaded to a circular bead 40 projecting above the cover 5, the cap screwing down pressure tight against the finished outer surface of the cover.

This cap is provided with one or more drilled sealing lugs 42, and the cover with a similar cooperating lug 43, and if desired the body of the device with a further cooperating lug at 44 so that the device after being once set and the cap screwed on may be sealed by the official sealer with wire and a lead seal as indicated at 45.

An optional adjustment of the capacity piston is shown in Fig. 5 wherein the end of the threaded stem 34 is slotted for turning with a screwdriver and is then secured with a simple lock nut 46, the whole being covered by a threaded cap 39' fitting pressure tight against the cover 5.

In contemplating my meter it will be seen that it may readily be assembled by placing in position all the parts including the entire train of indicating gears without securing them in any way except by the closures 5 and 16.

In operation, the device is mounted with a valved pressure oil or lubricant pipe connected to the inlet 12 and a delivery pipe to the outlet 13, the pointer 14 is turned to zero, the oil under pressure is permitted to flow through the device or outlet for any desired purpose, and with suitable graduations on the dial will register either in pounds of oil passing or in quarts, all depending on the graduations selected.

The adjustable piston 32 is found to provide a variation of some twenty five to fifty per cent either way from an average so that the device will accurately register one pound for a pound of oil or grease of greatly differing weights per quart, and moreover the meter once adjusted and sealed has been found to maintain its accuracy under varying pressure of oil, the speed only being affected by a difference in pressure.

I claim:

1. A liquid meter comprising a body provided with a circular chamber open at one end, a vaned rotor revolvably mounted in the chamber, indicating means connected with said rotor adapted to indicate the number of revolutions of the same, outlet and inlet ports to the chamber arranged to cause revolution of the rotor upon forcing a liquid through the ports and chamber, a cover on the open end of said chamber, and a disk fitting against the end face of said rotor beneath the cover, and means for adjusting said disk toward and away from said rotor.

2. A liquid meter comprising a body provided with a circular chamber open at one end, a vaned rotor revolvably mounted in the chamber, indicating means connected with said rotor adapted to indicate the number of revolutions of the same, outlet and inlet ports to the chamber arranged to cause revolutions of the rotor upon forcing a liquid through the ports and chamber, a cover on the open end of said chamber, and a disk fitting against the end face of said rotor beneath the cover, and means for adjusting said disk toward and away from said rotor, said last mentioned means including a stem on said disk threadedly extending through said cover, a worm gear on said stem outside of the cover, and means for locking the worm gear at various points of revolution.

3. A liquid meter comprising a body provided with a circular chamber open at one end, a vaned rotor revolvably mounted in the chamber, indicating means connected with said rotor adapted to indicate the number of revolutions of the same, outlet and inlet ports to the chamber arranged to cause revolutions of the rotor upon forcing a liquid through the ports and chamber, a cover on the open end of said chamber, and a disk fitting against the end face of said rotor beneath the cover, and means for adjusting said disk toward and away from said rotor, said last mentioned means including a stem on said disk threadedly extending through said cover, a gear on said stem outside of the cover, and a worm in mesh with said gear rotatably mounted and arranged for revolving said gear and for locking the gear at various points of revolution.

4. A liquid meter comprising a body provided with a circular chamber open at one end, a vaned rotor revolvably mounted in the chamber, indicating means connected with said rotor adapted to indicate the number of revolutions of the same, outlet and inlet ports to the chamber arranged to cause revolution of the rotor upon forcing a liquid through the ports and chamber, a cover screwed over the open end of said chamber and provided with a bore equal in diameter to said chamber, a piston fitting within said cover movable axially in and out of said chamber adjacent the face of said rotor, and means operative from the outside of the cover for so moving said piston and for locking it in adjusted position.

5. A liquid meter comprising a body provided with a circular chamber open at one end, a vaned rotor revolvably mounted in the chamber, indicating means connected with said rotor adapted to indicate the number of revolutions of the same, outlet and inlet ports to the chamber arranged to cause revolution of the rotor upon forcing a liquid through the ports and chamber, a cover screwed over the open end of said chamber and provided with a bore equal in diameter to said chamber, a piston fitting within said cover movable axially in and out of said chamber adjacent the face of said rotor, and means operative from the outside of the cover for so moving said piston and for locking it in adjusted position, a removable cap over said last mentioned means, and means for sealing said cap against removal.

6. A liquid meter comprising a body provided with a circular chamber, an imperforate vaned rotor revolvably mounted in the chamber, indicating means connected with said rotor adapted to indicate the number of revolutions of the same, outlet and inlet ports to the chamber arranged to cause revolution of the rotor upon forcing a liquid through the ports and chamber, and means for causing a certain amount of liquid to by-pass over the ends of said vanes thus varying the amount of liquid delivered in respect to a given number of revolutions of the rotor.

7. A liquid meter comprising a body provided with a circular chamber, a vaned rotor revolvably mounted in the chamber, said vanes being fixedly spaced in angular relation to each other, indicating means connected with said rotor adapted to indicate the number of revolutions of the same, outlet and inlet ports to the chamber arranged to cause revolution of the rotor upon forcing a liquid through the ports and chamber, and means for causing a certain amount of liquid to by-pass over the ends of said vanes thus varying the amount of liquid delivered in respect to a given number of revolutions of the rotor.

ORA B. HALEY.